United States Patent
Kachare et al.

(10) Patent No.: US 11,262,915 B2
(45) Date of Patent: *Mar. 1, 2022

(54) METHOD FOR READ LATENCY BOUND IN SSD STORAGE SYSTEMS

(71) Applicant: Samsung Electronics Co., Ltd., Suwon-si (KR)

(72) Inventors: Ramdas Kachare, Cupertino, CA (US); Oscar Pinto, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,240

(22) Filed: May 18, 2020

(65) Prior Publication Data

US 2020/0278796 A1 Sep. 3, 2020

Related U.S. Application Data

(63) Continuation of application No. 16/138,419, filed on Sep. 21, 2018, now Pat. No. 10,732,849, which is a continuation of application No. 15/360,869, filed on Nov. 23, 2016, now Pat. No. 10,146,444.

(60) Provisional application No. 62/403,624, filed on Oct. 3, 2016.

(51) Int. Cl.
*G06F 3/06* (2006.01)

(52) U.S. Cl.
CPC .......... *G06F 3/0611* (2013.01); *G06F 3/0659* (2013.01); *G06F 3/0688* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 6,304,955 B1 | 10/2001 | Arora | |
| 7,306,140 B2 | 12/2007 | Takashi et al. | |
| 7,593,263 B2 | 9/2009 | Sokolov et al. | |
| 8,179,468 B2 | 5/2012 | Sarwari | |
| 8,255,618 B1 | 8/2012 | Borchers et al. | |
| 8,825,441 B2 | 9/2014 | Watanabe | |
| 9,032,177 B2 | 5/2015 | Alcantara et al. | |
| 9,588,700 B2 | 3/2017 | Jeong et al. | |
| 9,880,951 B2 | 1/2018 | Ono | |
| 10,146,444 B2 * | 12/2018 | Kachare | G06F 3/0688 |
| 10,732,849 B2 * | 8/2020 | Kachare | G06F 3/0659 |
| 2002/0013915 A1 | 1/2002 | Migita et al. | |
| 2004/0156315 A1 | 8/2004 | Walls et al. | |
| 2008/0168226 A1 | 7/2008 | Wang | |

(Continued)

FOREIGN PATENT DOCUMENTS

| | | |
|---|---|---|
| JP | 2015-52923 A | 3/2015 |
| KR | 10-2005-0113498 A | 12/2005 |

(Continued)

*Primary Examiner* — Edward J Dudek, Jr.
(74) *Attorney, Agent, or Firm* — Lewis Roca Rothgerber Christie LLP

(57) ABSTRACT

A storage system configured to mitigate the effect of a long latency tail in solid state drives. The system includes a host and a plurality of solid state drives. The host sets a latency threshold in each solid state drive. Each solid state drive may abort any read command when the execution time exceeds the latency threshold, and the host may then send the same read command to another solid state drive.

20 Claims, 10 Drawing Sheets

(56) References Cited

U.S. PATENT DOCUMENTS

| | | |
|---|---|---|
| 2012/0239556 A1 | 9/2012 | Magruder et al. |
| 2013/0024734 A1 | 1/2013 | Katsuragi |
| 2013/0311424 A1 | 11/2013 | Rodrigo |
| 2013/0336334 A1 | 12/2013 | Gilbert et al. |
| 2014/0201471 A1 | 7/2014 | Cutter et al. |
| 2014/0330919 A1 | 11/2014 | Jiang et al. |
| 2015/0074337 A1 | 3/2015 | Jo et al. |
| 2015/0134607 A1 | 5/2015 | Magdon-Ismail et al. |
| 2015/0161388 A1 | 6/2015 | Margalit et al. |
| 2015/0227465 A1 | 8/2015 | Sundaram et al. |
| 2015/0302937 A1 | 10/2015 | Roberts et al. |
| 2016/0085289 A1 | 3/2016 | Khatib et al. |
| 2016/0188223 A1 | 6/2016 | Camp et al. |

FOREIGN PATENT DOCUMENTS

| | | |
|---|---|---|
| KR | 10-2015-0104858 A | 9/2015 |
| WO | 2008/126218 A1 | 10/2008 |

\* cited by examiner

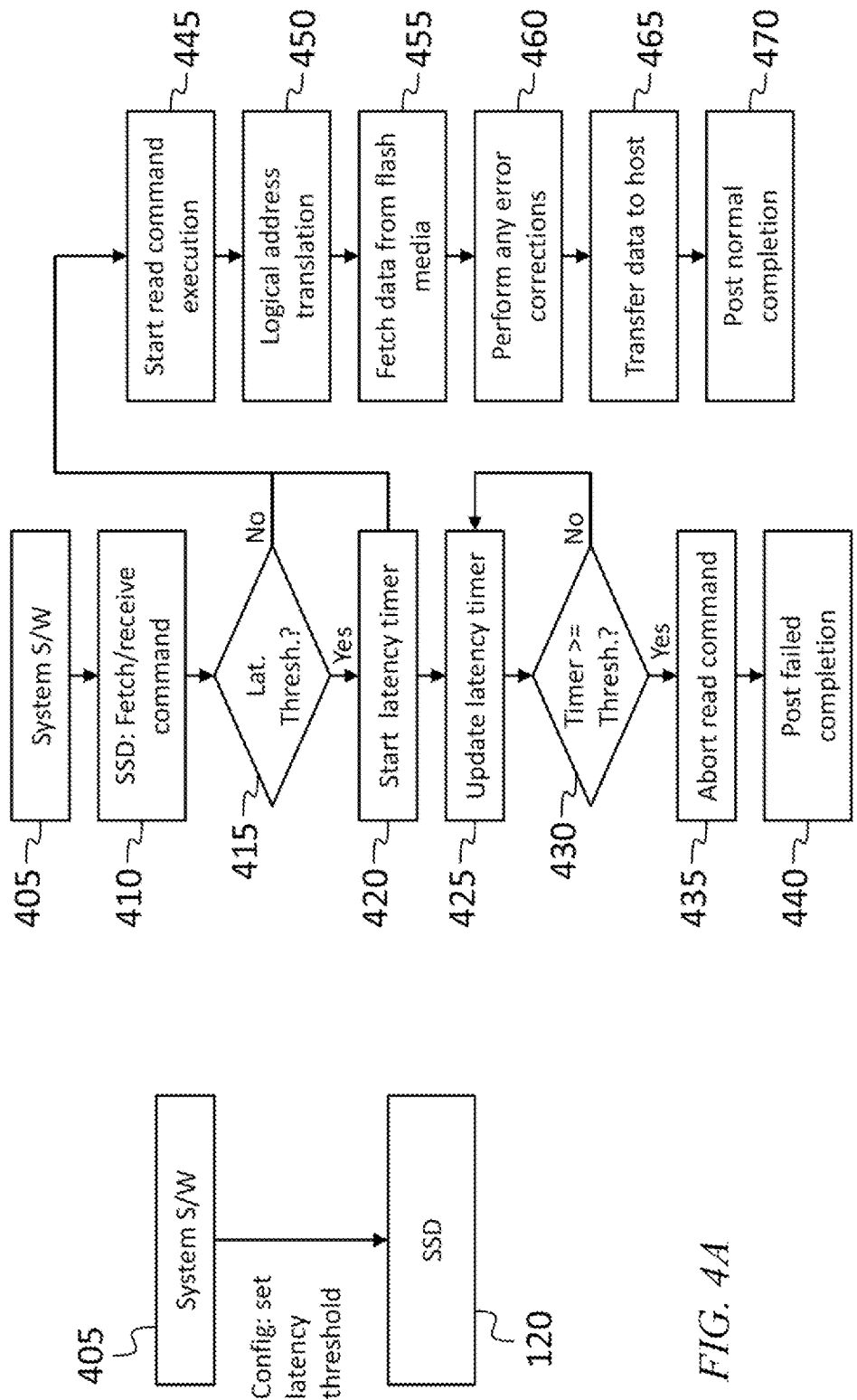

| Attempt | % Completions | | Latency (us) |
|---|---|---|---|
| | Per attempt | Total | |
| 1 | 99 | 99 | 100 |
| 2 | 0.99 | 99.99 | 200 |
| 3 | 0.0099 | 99.9999 | 300 |
| Error recovery | 0.0001 | | |

*FIG. 6*

| Attempt | Completions | | Latency (us) |
|---|---|---|---|
| | Per attempt | Total | |
| 1 | 990000 | 990000 | 100 |
| 2 | 9900 | 999900 | 200 |
| 3 | 99 | 999999 | 300 |
| Error recovery | 1 | | |

*FIG. 7*

| Attempt | % Completions | | Latency (us) |
|---|---|---|---|
| | Per attempt | Total | |
| 1 | 99 | 99 | 100 |
| Error recovery | 1 | 100 | 100 us to N ms |

*FIG. 8*

| Attempt | Completions | | Latency (us) |
|---|---|---|---|
| | Per attempt | Total | |
| 1 | 990000 | 990000 | 100 |
| Error recovery | 10000 | 1000000 | 100 us to N ms |

*FIG. 9*

METHOD FOR READ LATENCY BOUND IN SSD STORAGE SYSTEMS

CROSS-REFERENCE TO RELATED APPLICATION(S)

The present application is a continuation of U.S. patent application Ser. No. 16/138,419, filed Sep. 21, 2018, which is continuation of U.S. patent application Ser. No. 15/360,869, filed Nov. 23, 2016, now U.S. Pat. No. 10,146,444, which claims priority to and the benefit of U.S. Provisional Application No. 62/403,624; filed Oct. 3, 2016, entitled "NOVEL METHOD FOR MAX READ LATENCY BOUND IN SSD STORAGE SYSTEMS", the entire contents of all of which are incorporated herein by reference.

FIELD

One or more aspects of embodiments according to the present invention relate to read latency, and more particularly to a system and method for controlling read latency in a storage system including solid state drives.

BACKGROUND

The process of executing a read command in a solid state drive may include operations that may require varying execution times, and a small fraction of read operations may fall under a long band of the read latency distribution, referred to as a "long latency tail". As a result, the execution of a read command may on occasion be sufficiently long to compromise the performance of a host application from which the read command originated.

Thus, there is a need for a system and method for mitigating the effects of varying read command execution times in solid state drives.

SUMMARY

Aspects of embodiments of the present disclosure are directed toward a storage system configured to mitigate the effect of a long latency tail in solid state drives. The system includes a host and a plurality of solid state drives. The host sets a latency threshold in each solid state drive. Each solid state drive may abort any read command when the execution time exceeds the latency threshold, and the host may then send the same read command to another solid state drive.

According to an embodiment of the present invention there is provided a method for reading data, by a host, from a storage pool including a plurality of storage devices, the method including: receiving, by a first storage device of the plurality of storage devices, a read command; and when a latency threshold bit in the read command is set: starting, by the first storage device, a timer at receipt of the read command; initiating, by the first storage device, a read operation in the first storage device; when the read operation is complete when, according to the timer, a time interval less than a latency threshold has elapsed: returning, by the first storage device, a command completion entry with results of the read operation; and when the read operation is not complete when, according to the timer, a time interval greater than or equal to the latency threshold has elapsed: aborting, by the first storage device, the read operation; and returning, by the first storage device, a command completion entry indicating that the latency threshold was exceeded.

In one embodiment, the method includes: sending, by the host, the read command, with the latency threshold bit set, to the first storage device; and when the read operation is aborted by the first storage device, sending the read command to a second storage device of the plurality of storage devices.

In one embodiment, the method includes, when the read operation is aborted by the second storage device, sending the read command, with the latency threshold bit set, to a third storage device of the plurality of storage devices.

In one embodiment, the method includes, when the read operation is aborted by the third storage device, sending a read command, with the latency threshold bit not set, to a storage device from among the first storage device, the second storage device, and the third storage device.

In one embodiment, the method includes, querying, by the host, the first storage device, to determine whether it supports a latency threshold feature.

In one embodiment, the method includes, when the first storage device supports the latency threshold feature, sending the latency threshold to the first storage device.

In one embodiment, the method includes, when the first storage device supports the latency threshold feature, sending a plurality of latency thresholds, corresponding to a plurality of respective storage areas, to the first storage device.

In one embodiment, the read command specifies a range of addresses within a storage area from among the plurality of respective storage areas; and the latency threshold is the latency threshold corresponding to the storage area.

In one embodiment, each of the plurality of respective storage areas is defined by a range of logical block addresses or by a namespace.

In one embodiment, the storage device is a solid state drive.

In one embodiment, the method includes: auto-self-characterizing, by the first storage device, to generate statistical data representing the performance of the first storage device; and making the statistical data available to the host in vendor specific log pages, wherein the auto-self-characterizing includes monitoring and recording read latencies during operation.

According to an embodiment of the present invention there is provided a solid state drive including: a solid state drive control circuit; and a flash memory including one or more flash memory dies, the solid state drive control circuit being configured to: receive a read command; and when a latency threshold bit in the read command is set: start a timer at receipt of the read command; initiate a read operation in the solid state drive; when the read operation is complete when, according to the timer, a time interval less than a latency threshold has elapsed: return a command completion entry with results of the read operation; and when the read operation is not complete when, according to the timer, a time interval greater than or equal to the latency threshold has elapsed: abort the read operation; and return a command completion entry indicating that the latency threshold was exceeded.

In one embodiment, the solid state drive control circuit is further configured: when it receives a query as to whether the solid state drive supports a latency threshold feature, to return a reply indicating that the solid state drive supports the latency threshold feature.

In one embodiment, the solid state drive control circuit is further configured: when the latency threshold bit in the read command is not set, to execute a read operation in the solid state drive and to return a command completion entry with results of the read operation.

In one embodiment, the solid state drive control circuit is further configured to: when it receives a command to set a latency threshold, to store the latency threshold.

In one embodiment, the solid includes a plurality of latency thresholds, corresponding to a plurality of respective storage areas, in the solid state drive; and to store the plurality of latency thresholds.

In one embodiment, the solid state drive control circuit is further configured to: when the read command specifies a range of addresses within a storage area from among the plurality of respective storage areas, to determine whether a time interval equal to the latency threshold has elapsed based on the latency threshold corresponding to the storage area.

According to an embodiment of the present invention there is provided a system including a host and a plurality of solid state drives, the host being configured to: send, to a first solid state drive of the plurality of solid state drives, a read command, the read command including a latency threshold bit, the latency threshold bit being set; and the first solid state drive being configured to: receive the read command; and start a timer at receipt of the read command; initiate a read operation in the solid state drive; when the read operation is complete when, according to the timer, a time interval less than a latency threshold has elapsed: return a command completion entry with results of the read operation; and when the read operation is not complete when, according to the timer, a time interval greater than or equal to the latency threshold has elapsed: abort the read operation; and return a command completion entry indicating that the latency threshold was exceeded.

In one embodiment, the host is further configured: when the read operation is aborted by the first solid state drive, to send the read command, with the latency threshold bit set, to a second solid state drive of the plurality of solid state drives.

In one embodiment, the host is further configured: when the read operation is aborted by the second solid state drive, to send the read command, with the latency threshold bit set, to a third solid state drive of the plurality of solid state drives.

In one embodiment, the host is further configured: when the read operation is aborted by the third solid state drive, to send the read command, with the latency threshold bit not set, to a storage device from among the first solid state drive, the second solid state drive, and the third solid state drive.

BRIEF DESCRIPTION OF THE DRAWINGS

These and other features and advantages of the present invention will be appreciated and understood with reference to the specification, claims, and appended drawings wherein:

FIG. 4A is a block diagram of a server and a solid state drive, according to an embodiment of the present invention;

FIG. 4B is a flow chart of a method for responding to a read command, according to an embodiment of the present invention;

FIG. 6 is a table illustrating read performance statistics, according to an embodiment of the present invention;

FIG. 7 is a table illustrating read performance statistics, according to an embodiment of the present invention;

FIG. 8 is a table illustrating read performance statistics, according to an embodiment of the present invention; and FIG. 9 is a table illustrating read performance statistics, according to an embodiment of the present invention.

DETAILED DESCRIPTION

The detailed description set forth below in connection with the appended drawings is intended as a description of example embodiments of a method for read latency bound in solid state drive storage systems provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Data storage is an integral and important part of modern information technology infrastructure. Various applications generate and process vast amounts of data to provide meaningful services to end users. Many such applications may be mission critical and rely on very fast and reliable access to the data. In addition to low latency, reliability, and high availability, many applications rely on highly deterministic or predictable latencies for accessing the data. Because of the complexities involved in data storage systems, it may be challenging to provide deterministic and predictable data access latencies.

Figure 1:
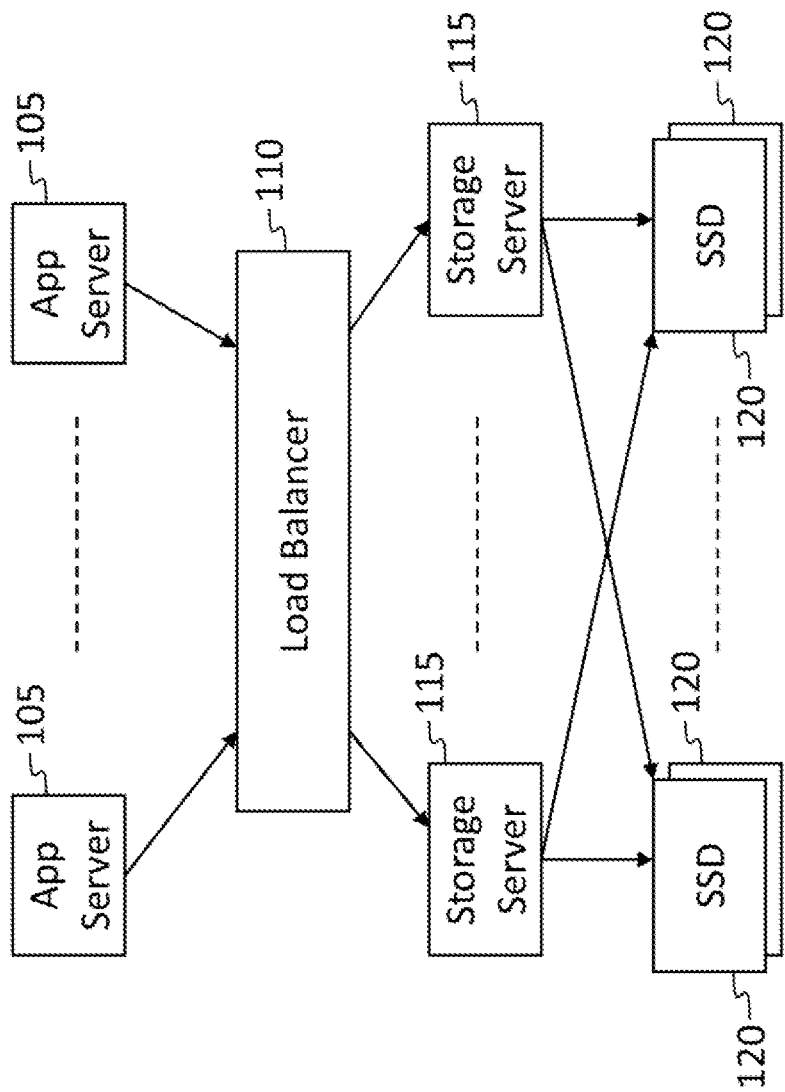
FIG. 1 is a block diagram of an information technology system, according to an embodiment of the present invention.

FIG. 1 shows an information technology infrastructure with a data storage system, in one embodiment. A set of application servers (or "app servers") 105 run end user applications. Storage servers 115 manage and provide data storage services to the application servers 105. The application servers 105 are the front-end interface to the users running various applications, and they access relevant data to provide the user service. The storage servers 115 may be connected to the application servers 105 by a load balancer 110. The storage servers 115 may manage the various aspects of data storage such as performance, reliability, back-ups, etc. The storage servers 115 maintain an array of storage drives (or "storage devices"), including, e.g., solid state drives 120, hard disk drives (HDDs) and tape drives (including tapes). The array of storage drives may be referred to as a "storage pool". When a storage server 115 gets a request for a certain block of user data, it determines where the data resides, reads the data from the appropriate storage drive or drives, and provides the data to the application servers 105.

For redundancy purposes multiple copies of the user data may be kept. For example, two or three copies of the same data may be maintained to protect against data loss due to various failures. If a read command fails on a storage drive (e.g., on a solid state drive 120), the storage server 115 attempts to fetch the data from the second or third copy of the data and initiates a data recovery mechanism to get back to the desired level of data redundancy.

Figure 2:
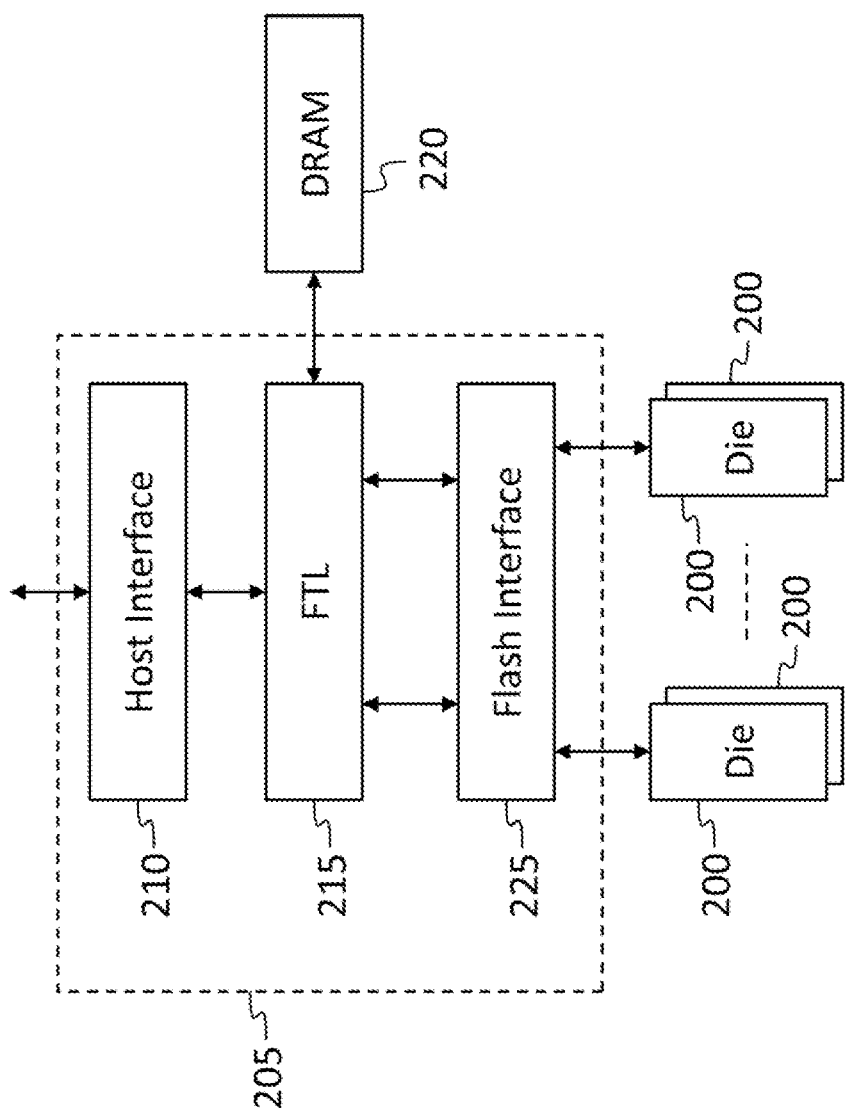
FIG. 2 is a block diagram of a solid state drive, according to an embodiment of the present invention.

Referring to FIG. 2, each solid state drive 120 may store data in NAND flash media which may include (e.g., consist of) a plurality of flash dies 200. Different types of flash media, e.g., single level cell (SLC), multi-level call (MLC), or triple-level cell (TLC) flash media may be used, and the media may be fabricated using different manufacturing processes. As a result, the performance characteristics of flash media may vary considerably. A solid state drive controller (or "solid state drive control circuit") 205 manages the flash media and provides access to the data to a host (or "storage server" or "storage server host") to which the solid state drive 120 is attached. The solid state drive controller 205 may be a processing circuit (discussed in further detail below). The solid state drive controller 205 may include a host interface 210, e.g., through a connector and a protocol customarily used by a host and storage device to exchange storage commands and responses. The connector and protocol may conform to, for example, Peripheral Component Interconnect Express (PCIe), remote direct memory access (RDMA) over Ethernet, Serial Advanced Technology Attachment (SATA), Fibre Channel, Serial Attached SCSI (SAS), Non Volatile Memory Express (NVMe), or to a more general-purpose interface such as Ethernet or Universal Serial Bus (USB).

The host interface 210 is used by the storage server host to communicate with the solid state drive 120. Input output (IO) commands such as data read and data write commands, as well as various media management commands (e.g., Identify, Get Log, etc.) may be sent to the solid state drive 120 by the host over the host interface 210. The same interface may be used by the solid state drive 120 to perform data transfers to and from storage server host system memory. A flash translation layer (FTL) 215 may provide a mapping between (i) logical addresses used by the storage server and (ii) physical locations of the data on the flash media. The flash translation layer 215 also performs various background operations like garbage collection (GC), wear leveling, recovery from unsafe shutdowns, and the like. As a result, host IO commands may co-exist with background operations and these two types of flash media access may compete with each other for flash media resources. This may lead to variations in the performance levels (e.g., read latency variations) experienced by the storage server host. The flash translation layer 215 may store internal data structures on chip or, e.g., in an off-chip dynamic random access memory (DRAM) 220, and access to those data structures may have its own performance variations, which may also contribute to read latency variations.

A flash interface 225 performs read and write data operations on the flash media (i.e., on the flash dies 200). The flash media has protocols such as the Open NAND Flash Interface (ONFI) and Toggle to perform these operations. The flash media also has certain media specific rules and timing parameters regarding how data read and write operations are done. The flash interface 225 may also endeavor to maximize (e.g., improve) the performance, power consumption, and other operating characteristics of the flash media, and it may protect against media errors, e.g., by performing data encoding and error correction to ensure data reliability. As used herein, a "read command" is a command sent by a host to a storage device, requesting data; in response a "read operation" is an operation performed internally by the storage device, which may include, e.g., fetching data from flash memory media.

Figure 3A:
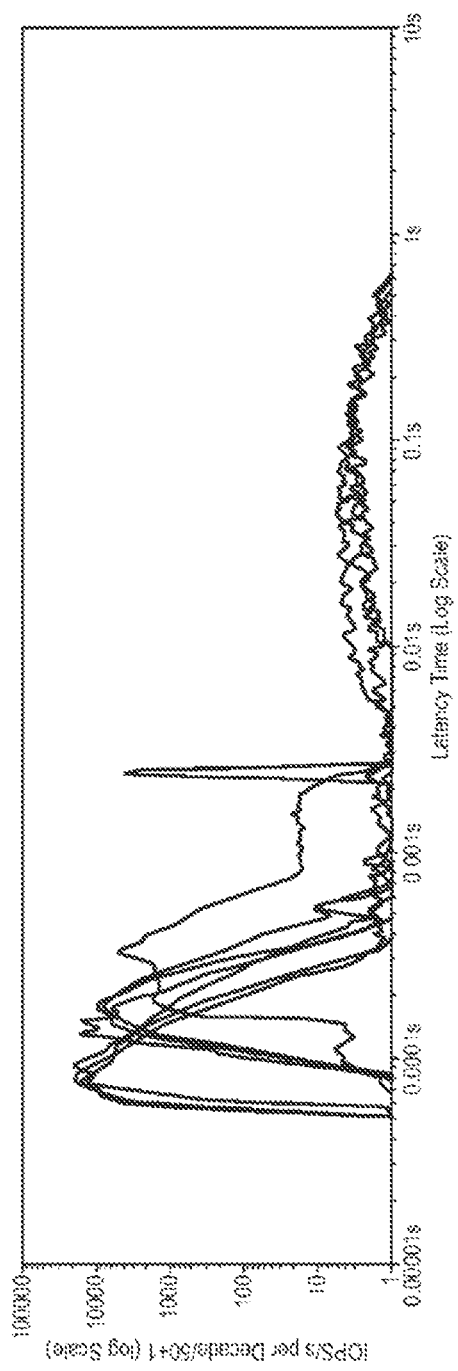
FIG. 3A is a graph of read latency, according to an embodiment of the present invention.
Figure 3B:
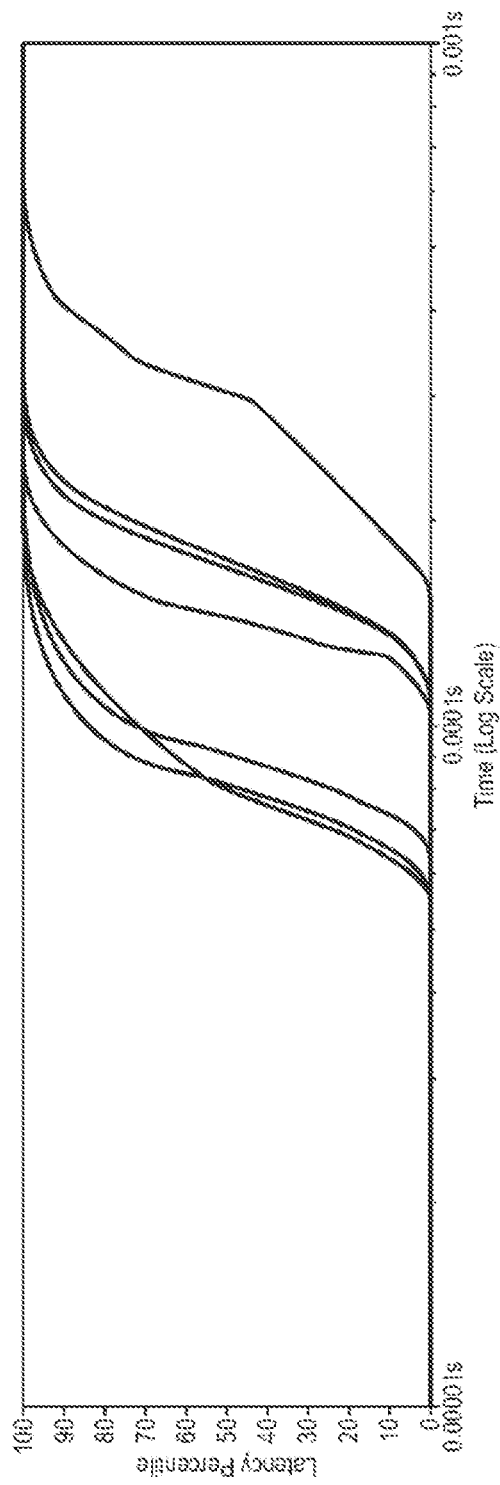
FIG. 3B is a percentile graph of read latency, according to an embodiment of the present invention.

As described above, storage servers are designed to provide fast and reliable access to the user data. The storage performance can be viewed in terms of throughput and latency. Latency of data access is the time taken from data request to actual data availability. FIG. 3A shows, on a logarithmic scale, the statistical distribution of read latency for various examples of flash media, and FIG. 3B shows the corresponding percentile (e.g., cumulative) data. To provide user data back to the application servers, a number of functions need to be performed by the storage server, solid state drive controllers, and other components in the storage subsystem. As mentioned above, these functions may take variable amounts of time and hence overall data read latency may vary widely. For example the read latency may range from a few micro-seconds to several milliseconds in solid state drive storage systems. For some latency-sensitive applications such a wide range of read latency may not be acceptable; such applications may rely on a deterministic upper bound on read latency.

For solid state drives, it may be the case that a majority (e.g., 95%) of read operations complete in a relatively short time (e.g., 100 us) that is adequate for latency-sensitive applications, but the remainder of the read commands may take significantly longer to complete, e.g., many milliseconds. This performance characteristic may be referred to as a long latency tail. For example, referring to the percentile graph of FIG. 3B, a 99% latency percentile at 100 microseconds (us) refers to that 99% of the read commands may be expected to complete within 100 us. The remaining 1% of the read commands may be expected to fall in the long latency tail, i.e., taking more than 100 us and up to several milliseconds to complete.

In some embodiments, a solid state drive monitors and records how long it takes for a read command to complete. The solid state drive may abort a read operation if it takes longer than a threshold time or "latency threshold" to complete. This behavior may be referred to as the "latency threshold feature". The storage server may then send the read command to another solid state drive. If the read command then completes successfully on the second attempt within the latency threshold, then the total time taken for the read command to have been executed is at most twice the latency threshold. Moreover, the likelihood that either the first or the second read attempt will be completed within the latency threshold may be quite high, as discussed in further detail below. As such, embodiments of the present invention provide a system and method for ensuring with high probability that a read command will be executed within a set time, e.g., two or three times the set latency threshold.

A solid state drive may use an Identify data structure to indicate whether or not it supports the latency threshold feature. For example, a 4096 byte Identify data structure is defined in section 5.11 of the NVM Express (NVMe) standard, Revision 1.2a (the "NVMe standard", available at nvmexpress.org, and incorporated herein by reference). The NVMe Identify data structure includes a field for identifying the vendor (e.g., the vendor of the solid state drive) and further fields that are reserved or unused, that a vendor may define to include an indication of whether the solid state drive supports the latency threshold feature. Accordingly, the host may infer, from the combination of these fields, whether the solid state drive supports the latency threshold feature.

If a solid state drive supports the latency threshold feature, the system software operating in the storage server may configure the solid state drive with a latency threshold. This latency threshold may be based on the characteristics of the solid state drive and accordingly corresponds to a percentage of read commands that are expected to complete within that threshold. For example, if the solid state drive used in the system provides a latency percentile of 99% at 100 us latency, then the solid state drive may be expected to exhibit a maximum read latency of 100 us for 99% of the read commands it receives and executes. The solid state drive may also be expected to exhibit a read latency of more than 100 us (and potentially up to many milliseconds) for 1% of the read commands it receives and executes.

The system software may be in possession of latency percentile data of a solid state drive from data sheets for the solid state drive, or the system software may perform testing on the solid state drive to obtain this information. In some embodiments, a solid state drive monitors read command processing and records the latencies to create latency distribution and latency percentile data, i.e., the solid state drive may auto-self-characterize during normal operation. The results of this self-characterization (i.e., the read latency distribution and percentile data) may be made available to the system software through vendor specific log pages.

Referring to FIG. 4A, after reset, the system software 405 may query all of the solid state drives 120 in the system (e.g., requesting the Identify data structure from each) to check whether the solid state drives 120 support the latency threshold feature. If the solid state drives 120 support this feature, the system software configures the latency threshold for each solid state drive 120. Then, for each read command it issues, it indicates whether or not a latency threshold limit should be applied by setting a bit in read command, referred to herein as the "latency threshold bit". A reserved bit in the read command can be used for this purpose. For example, in an NVMe read command, bit 13 down to bit 10 (e.g., bit 10, bit 11, bit 12, and bit 13) of Command Dword 0 are otherwise unused, and any of these four bits may be used as the latency threshold bit. In some circumstances, it may be desirable not to set the latency threshold bit, e.g., for data recovery error handling, as described in further detail below.

Referring to FIG. 4B, when a read command is received, in an act 410, by the solid state drive controller, it checks, in an act 415, whether the latency threshold bit is set in that command. If a read command is enabled for latency threshold (i.e., if the latency threshold bit is set), the solid state drive controller starts a latency timer for the command, in an act 420, in the command execution context created for the command. Such a latency timer may be implemented in hardware or in firmware. The solid state drive controller periodically updates the timer, in an act 425, and checks the latency timer, in an act 430, for each of the active read commands. When the solid state drive controller determines, in the act 430, that a read command has taken an amount of time exceeding the latency threshold, then the solid state drive 120 internally aborts the read command, in an act 435, and returns an error status code, referred to herein as a "latency threshold exceeded" error status code, to the host, in the command completion queue entry (or "command completion entry") returned, in an act 440, to the host. In the alternative, if the command is not aborted, then the read command execution begins in an act 445, and proceeds successfully to completion, in acts 450-470, including, e.g., logical address translation 450, fetching data from flash media in an act 455, performing any error corrections in an act 460, transferring the data to the host in an act 465, and posting a normal command completion entry in an act 470. The command completion status value used to indicate that a read command was aborted because the latency threshold was exceeded may be any suitable otherwise unused value, e.g., 57h (i.e., 0x57, or hexadecimal 57).

Figure 5:
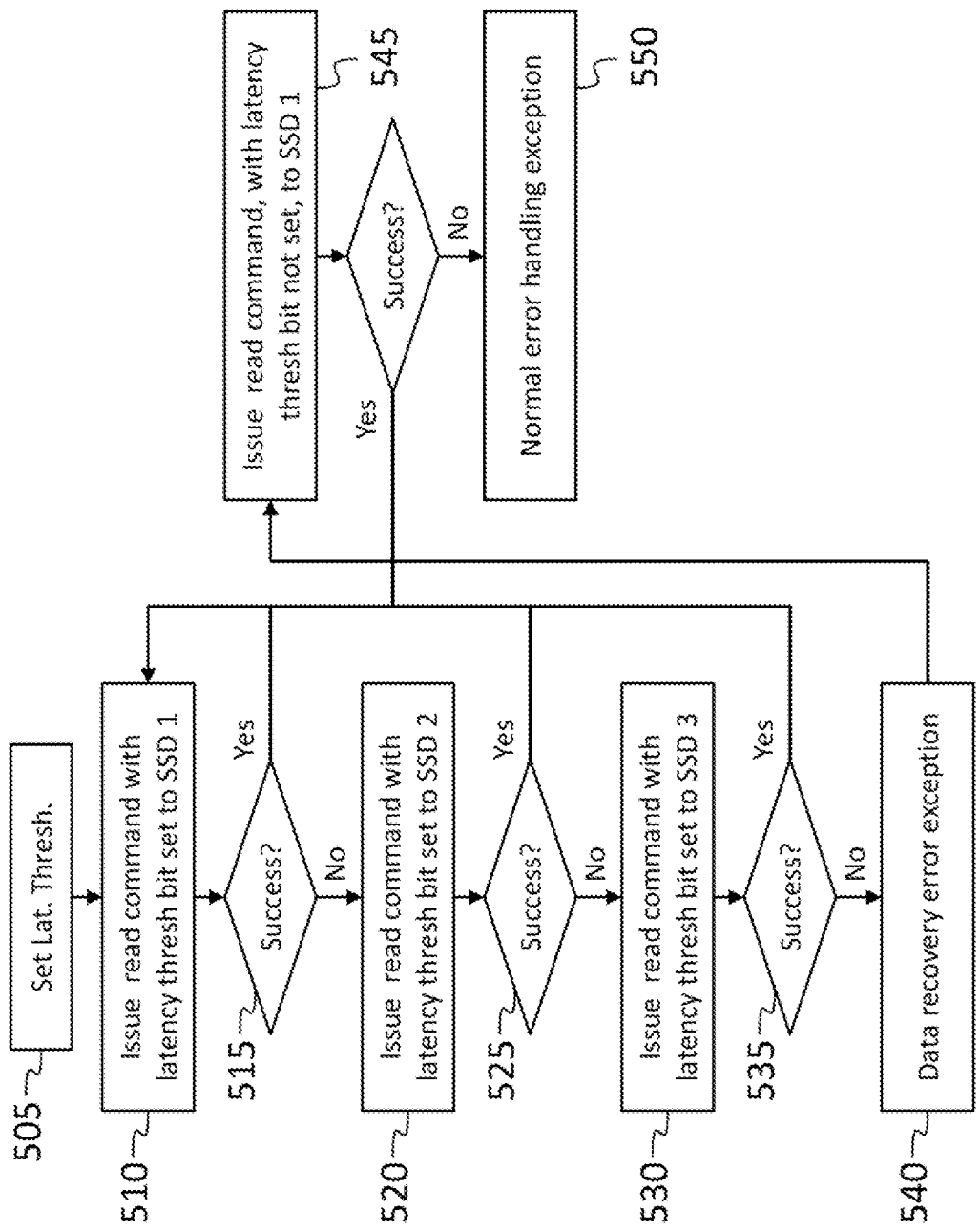
FIG. 5 is a flow chart of a method for reading data, according to an embodiment of the present invention.

FIG. 5 shows a flow chart for the actions of the storage server, in one embodiment. The storage server may initially, in an act 505, set a latency threshold in each of the solid state drives. It may then, in an act 510, issue a read command, with the latency threshold bit set. When the system software encounters, in an act 515, a latency threshold exceeded error status code in a command completion entry, it issues, in an act 520, the same read command, with the latency threshold bit set, to a second storage copy in another solid state drive. If the second read attempt completes successfully, the total latency for the read command execution, including the first unsuccessful attempt, and the second, successful attempt, may be less than or equal to the sum of the two latency thresholds in the respective solid state drives. For example, if both latency thresholds are 100 us, then the total latency for the read command execution may be less 200 us, which may be significantly less than the worst case latency for a solid state drive with a long latency tail. If 99% of the read commands complete successfully within the latency threshold, only a small fraction (e.g., 0.01% if the latencies in the two solid state drives are uncorrelated) may fail both in the first attempt and in a second attempt.

In an alternate embodiment, when the solid state drive controller determines, in the act 430, that a read command has taken an amount of time exceeding the latency threshold, the solid state drive 120 returns an error status code but does not internally abort the read command, and instead continues to attempt to complete the read command. The host may then send the read command to the second storage copy in another solid state drive, and use the data returned by the solid state drive that completes the read command first.

Using the latency threshold exceeded error status code, the system software may know the cause of a failure that results from a solid state drive exceeding the latency threshold. It may then repeat the same procedure until the read is successful or until it has exhausted all of the data copies in the system. With each read attempt, the probability of read success grows exponentially while latency increases linearly. A storage system may have, for example, at most three copies of any data; in such a system the procedure may stop after a third attempt. For example, in FIG. 5, if the system software encounters, in an act 525, a latency threshold exceeded error status code in a command completion entry, it issues, in an act 530, the same read command, with the latency threshold bit set, to a third storage copy in another solid state drive. If the read fails even in the last attempt (as determined by the system software in an act 535), it may be treated, in an act 540, as an error exception and the storage server host may initiate a data recovery error handling procedure.

In this situation it is known to the system software that the data is still present in at least one of the copies, although it has taken an exceptionally long time to retrieve it. The system software may then post, in an act 545, a read request with no latency limit (i.e., with the latency threshold bitlatency threshold bit not set), so that the solid state drive may allow the read command to take as much time as it needs to complete, and with any subsequent error handled, in an act 550, as in conventional read flows. The rate of such data recovery error events may be made small by suitable selection of solid state drives (e.g., by selecting solid state drives with suitable read latency performance), suitable selection of a latency threshold, and the storage of an adequate number of data copies. In some embodiments the storage pool is a hybrid storage pool including more than one kind of storage drive (e.g., including a plurality of hard disk drives and a plurality of solid state drives) and the read latency statistics of the storage system may reflect the latency characteristics of the drives in the storage pool. In an alternate embodiment, a parity-based measure is used to reconstruct the data.

The tables of FIGS. 6-9 show read latency distribution examples according to embodiments of the present invention. Latency percentile is assumed to be 99% at 100 us. It is assumed that the system has three copies of the data. The table of FIG. 6 shows that for the assumed system configuration, 99.9999% of reads may be expected to have a read latency upper bound of 300 us, and that it may be expected that the error handling exception will need to be invoked only for 0.0001% of read commands.

If it is assumed that the storage server system is capable of one million input output operations (IOPs) per second, the corresponding table is shown in FIG. 7. As shown in this table, one read command out of one million commands may be expected to undergo an error exception, i.e., one read command per second for a system operating at one million read operations per second.

On the other hand, if the latency threshold feature is not used, with normal read processing, the system may be expected to have the latency distribution shown in the table of FIG. 8. 99% of the read commands sent to the solid state drive may be expected to have latency less than or equal to 100 us, but the long tail of 1% of read commands may extend up to several milliseconds (or "N milliseconds").

For the example of a system executing one million read operations per second, 990,000 commands may be expected to complete in 100 us latency time or less, but 10,000 read commands may experience a high and unpredictable latency of up to several milliseconds.

A solid state drive may include several different latency thresholds. The latency threshold may be specified, e.g., globally (i.e., a single latency threshold may apply to the entire solid state drive), per logical block address (LBA) range, or per namespace. As defined in the NVMe standard, section 1.6.17, a namespace is a quantity of non-volatile memory that may be formatted into logical blocks. When formatted, a namespace of size n is a collection of logical blocks with logical block addresses from 0 to (n−1). For example, a reservation may be acquired on a namespace (e.g., by an application), in a solid state drive (using, e.g., a command specified in section 6.10 of the NVMe standard), and in the process a latency threshold may be assigned to the namespace. This latency threshold may be tailored to the relative importance, to the application, (i) of achieving low read latency for most read operations, and (ii) of avoiding data recovery errors. Latency thresholds may be set in the solid state drive by the host using, e.g., the Set Features command (documented in section 5.14 of the NVMe standard), or using the Dataset Management command (documented in section 6.7 of the NVMe standard).

In view of the foregoing, in some embodiments, a storage system including a host and a plurality of solid state drives may be able to mitigate the effect of a long latency tail by setting a latency threshold in each solid state drive. Each solid state drive may abort any read command when the execution time exceeds the latency threshold, and the host may then send the same read command to another solid state drive. In this manner, the effect of an exceptionally long execution time in a solid state drive may be to have the command transferred to another solid state drive, instead of delaying the completion of the command by an exceptionally long time.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "example" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a method for read latency bound in solid state drive storage systems have been specifically described and illustrated herein, many modifications and variations will be apparent to those skilled in the art. Accordingly, it is to be understood that a method for read latency bound in solid state drive storage systems constructed according to principles of this invention may be embodied other than as specifically described herein. The invention is also defined in the following claims, and equivalents thereof.

What is claimed is:

1. A method comprising:
   sending, by a host, a read command to a storage device;
   receiving, by the storage device, the read command from the host, the read command comprising a latency threshold bit;
   determining, by the storage device, that the latency threshold bit in the read command is set by the host;
   initiating, by the storage device, a read operation in the storage device;
   determining, by the storage device, that a time interval less than a latency threshold of the storage device has elapsed; and
   returning, by the storage device, a command completion entry with results of the read operation, based on determining that that the time interval less than the latency threshold of the storage device has elapsed.

2. The method of claim 1, further comprising:
   starting, by the storage device, a timer at receipt of the read command, wherein the latency threshold is received from the host.

3. The method of claim 2, further comprising:
   determining, by the storage device that, according to the timer, a time interval greater than or equal to the latency threshold has elapsed;
   aborting, by the storage device, the read operation, based on determining that, according to the timer, the time interval greater than or equal to the latency threshold has elapsed; and
   returning, by the storage device, to the host, an in-band command completion entry indicating that the latency threshold was exceeded.

4. The method of claim 3, further comprising:
   sending, by the host, the read command, with the latency threshold bit set, to the storage device, wherein the storage device is a first storage device of a plurality of storage devices; and
   sending the read command to a second storage device of the plurality of storage devices based on determining that the read operation is aborted by the storage device.

5. The method of claim 4, further comprising:
   sending the read command, with the latency threshold bit set, to a third storage device of the plurality of storage devices based on determining that the read operation is aborted by the second storage device.

6. The method of claim 5, further comprising:
   sending a read command, with the latency threshold bit not set, to a storage device from among the first storage device, the second storage device, and the third storage device, based on determining that the read operation is aborted by the third storage device.

7. The method of claim 1, further comprising, querying, by the host, the storage device to determine whether it supports a latency threshold feature.

8. The method of claim 7, further comprising,
   sending the latency threshold to the storage device based on determining that the storage device supports the latency threshold feature.

9. The method of claim 1, wherein:
   the read command specifies a range of addresses within a storage area from among a plurality of respective storage areas of the storage device, wherein the storage device receives a plurality of latency thresholds corresponding to the plurality of respective storage areas of the storage device from the host; and
   the latency threshold is the latency threshold corresponding to the storage area.

10. The method of claim 9, wherein each of the plurality of respective storage areas of the storage device is defined by a range of logical block addresses or by a namespace.

11. The method of claim 1, wherein the storage device is a solid state drive.

12. The method of claim 1, further comprising:
    auto-self-characterizing, by the storage device, to generate statistical data representing a performance of the storage device; and
    making the statistical data available to the host in vendor specific log pages,
    wherein the auto-self-characterizing comprises monitoring and recording read latencies during operation.

13. A solid state drive configured to:
    receive, a read command from a host, the read command comprising a latency threshold bit;
    determine that the latency threshold bit in the read command is set by the host;
    initiate a read operation in the solid state drive based on determining that the latency threshold bit in the read command is set by the host;
    determining that a time interval less than a latency threshold of the solid state drive has elapsed; and return a command completion entry with results of the read operation, based on determining that the time interval less than the latency threshold of the solid state drive has elapsed.

14. The solid state drive of claim 13, wherein the solid state drive comprising:
a solid state drive control circuit; and
a flash memory comprising one or more flash memory dies, wherein the solid state drive control circuit is configured to:
start a timer at receipt of the read command, wherein the latency threshold is received from the host.

15. The solid state drive of claim 14, wherein the solid state drive control circuit is further configured to:
determining that, according to the timer, a time interval greater than or equal to the latency threshold has elapsed;
abort the read operation, based on determining that according to the timer, the time interval greater than or equal to the latency threshold has elapsed; and
return, to the host, an in-band command completion entry indicating that the latency threshold was exceeded.

16. The solid state drive of claim 14, wherein the solid state drive control circuit is further configured to:
receive a query from the host as to whether the solid state drive supports a latency threshold feature; and
return a reply indicating that the solid state drive supports the latency threshold feature in response to the query from the host.

17. The solid state drive of claim 14, wherein the solid state drive control circuit is further configured to:
receive a command comprising a plurality of latency thresholds;
store the plurality of latency thresholds in the solid state drive;
determine that the read command specifies a range of addresses within a storage area from among a plurality of respective storage areas in the solid state drive; and
determine whether a time interval equal to the latency threshold has elapsed based on the latency threshold corresponding to the storage area, wherein the plurality of latency thresholds corresponds to the plurality of respective storage areas in the solid state drive.

18. The solid state drive of claim 13, wherein the solid state drive is further configured to:
determine that the latency threshold bit in the read command is not set;
execute a read operation in the solid state drive; and
return a command completion entry with results of the read operation.

19. A system comprising a host and a solid state drive, the host being configured to:
send, to the solid state drive, a read command comprising a latency threshold bit, the latency threshold bit being set by the host, the solid state drive being configured to:
receive the read command;
initiate a read operation in the solid state drive; and
determine that a time interval less than a latency threshold of the solid state drive has elapsed, wherein the latency threshold is received by the solid state drive from the host; and
return a command completion entry with results of the read operation based on determining that the time interval less than the latency threshold has elapsed.

20. The system of claim 19, wherein the solid state drive is further configured to:
start a timer at receipt of the read command;
determine that, according to the timer, a time interval greater than or equal to the latency threshold has elapsed;
abort the read operation, based on determining that, according to the timer, the time interval greater than or equal to the latency threshold has elapsed; and
return, to the host, an in-band command completion entry indicating that the latency threshold was exceeded, wherein the solid state drive is further configured to receive, from the host, a plurality of latency thresholds corresponding to a plurality of respective storage areas of the solid state drive.

* * * * *